United States Patent
Ayanam et al.

(10) Patent No.: US 9,851,990 B2
(45) Date of Patent: Dec. 26, 2017

(54) METHOD AND SYSTEM FOR PERFORMING ON-DEMAND DATA WRITE THROUGH BASED ON UPS POWER STATUS

(71) Applicant: AMERICAN MEGATRENDS, INC., Norcross, GA (US)

(72) Inventors: Varadachari Sudan Ayanam, Suwanee, GA (US); Lokeshraj Subramanian, Chennai (IN); Santhosh Samuel Mathews, Chennai (IN); Jayachandran Gnanasekaran, Duluth, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 0 days.

(21) Appl. No.: 14/610,425

(22) Filed: Jan. 30, 2015

(65) Prior Publication Data
US 2016/0224359 A1    Aug. 4, 2016

(51) Int. Cl.
*G06F 9/455* (2006.01)
*G06F 9/50* (2006.01)
(Continued)

(52) U.S. Cl.
CPC .......... *G06F 9/45533* (2013.01); *G06F 1/263* (2013.01); *G06F 1/30* (2013.01); *G06F 1/3203* (2013.01); *G06F 3/06* (2013.01); *G06F 3/0619* (2013.01); *G06F 3/0634* (2013.01); *G06F 3/0673* (2013.01); *G06F 9/4445* (2013.01); *G06F 9/45558* (2013.01);
(Continued)

(58) Field of Classification Search
CPC .. G06F 9/45533; G06F 9/4558; G06F 9/5016; G06F 1/3203; G06F 2009/45583; G06F 12/0804; G06F 12/0866; G06F 12/00; G06F 12/0877; G06F 3/061; G06F 1/263; G06F 1/30; G06F 3/06
See application file for complete search history.

(56) References Cited

U.S. PATENT DOCUMENTS 6,523,095 B1 *  2/2003  Breternitz, Jr. ...... G06F 9/30174
                                                          711/118
2010/0023940 A1 * 1/2010  Iwamatsu ............. G06F 1/3203
                                                            718/1

(Continued)

*Primary Examiner* — Lewis A Bullock, Jr.
*Assistant Examiner* — Jacob Dascomb
(74) *Attorney, Agent, or Firm* — Locke Lord LLP; Tim Tingkang Xia, Esq.

(57) ABSTRACT

Certain aspects of the present disclosure relates to a system having a virtual desktop server (VDS), which may be electrically powered by an electric power supply and an uninterruptable power supply (UPS). The VDS has a processor, a memory, and a storage device storing computer executable code. When executed at processor, the computer executable code is configured to: allocate a portion of storage device to create a data store, allocate a portion of memory to create a random access memory (RAM) disk, detect power status of the VDS, and perform write through cache operations based on the detected power status. In certain embodiments, the write through cache operations include: disabling data write through from RAM disk to data store, when VDS is powered by the EPS and the UPS; and enabling data write through from RAM disk to data store when VDS is electrically powered by UPS only.

19 Claims, 4 Drawing Sheets

(51) Int. Cl.

| | | |
|---|---|---|
| *G06F 1/32* | (2006.01) | |
| *G06F 9/44* | (2006.01) | |
| *G06F 3/06* | (2006.01) | |
| *G06F 1/26* | (2006.01) | |
| *G06F 1/30* | (2006.01) | |
| G06F 12/0871 | (2016.01) | |

(52) U.S. Cl.
CPC ........ *G06F 9/5016* (2013.01); *G06F 12/0871* (2013.01); *G06F 2009/45579* (2013.01); *G06F 2009/45583* (2013.01)

(56) References Cited

U.S. PATENT DOCUMENTS

| | | | |
|---|---|---|---|
| 2012/0137289 A1* | 5/2012 | Nolterieke | G06F 9/45558 718/1 |
| 2013/0097458 A1* | 4/2013 | Sekino | G06F 11/1441 714/6.3 |
| 2013/0111474 A1* | 5/2013 | Agarwal | G06F 9/45558 718/1 |
| 2014/0068183 A1 | 3/2014 | Joshi et al. | |
| 2014/0173591 A1 | 6/2014 | Lin et al. | |
| 2015/0033229 A1* | 1/2015 | Tegtmeier | H04L 41/145 718/1 |
| 2015/0142908 A1 | 5/2015 | Sun | |
| 2015/0378921 A1 | 12/2015 | Karippara et al. | |
| 2016/0092255 A1 | 3/2016 | Bernal et al. | |
| 2016/0103613 A1 | 4/2016 | Oshins et al. | |

\* cited by examiner

METHOD AND SYSTEM FOR PERFORMING ON-DEMAND DATA WRITE THROUGH BASED ON UPS POWER STATUS

FIELD

The present disclosure relates generally to virtual desktop infrastructure (VDI) technology, and more particularly to systems and methods of performing on-demand data write through in a VDI system using a random access memory (RAM) disk based on power status of an uninterruptible power supply (UPS).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A RAM disk is a block of volatile random access memory that computer software is treating as if the memory is a disk drive (non-volatile storage space). The performance of a RAM disk is in general much faster than other forms of storage media, such as a solid state drive (SSD), hard drive (HD), or optical drive (CD or DVD drives). The performance gain is due to access time, maximum throughput, and type of file systems, among other things. The RAM disk is used as if it is a non-volatile storage device to store persistent data. Cache is often used in connection to the RAM disk. A copy of data temporarily is stored in rapidly-accessible storage media such as memory local to the processor or central processing unit (CPU) such that when this data is accessed by the processor, the processor can retrieve the data from the local memory instead of non-volatile storage devices such as the SSDs, the HDs, CD or DVD drives. In virtual desktop infrastructure, the RAM disks are frequently used to store data from various virtual machines running on a virtual desktop server. In certain applications, the RAM disk is used with write through cache to store temporary data indiscriminately, and certain data may not need to be stored in the RAM disk.

Therefore, an unaddressed need exists in the art to address the aforementioned deficiencies and inadequacies.

SUMMARY

In one aspect, the present disclosure relates to a system for performing write through operations. In certain embodiments, the system includes a virtual desktop server, which is configured to be electrically powered by an electric power supply and an uninterruptable power supply (UPS). The virtual desktop server has a processor, a memory, and a storage device storing computer executable code. When the computer executable code is executed at the processor, the computer executable code is configured to: allocate a portion of the storage device to create a data store for preserving data from a plurality of virtual machines (VMs); allocate a portion of the memory to create a random access memory (RAM) disk for hosting the plurality of VMs and writing through the data from the plurality of VMs to the data store; detect a power status of the virtual desktop server; and perform a plurality of data write through operations based on the detected power status of the virtual desktop server. The data write through operations include: disabling data write through from the RAM disk to the data store when the virtual desktop server is electrically powered by the electric power supply and the UPS; and enabling the data write through from the RAM disk to the data store when the virtual desktop server is electrically powered by the UPS only.

In certain embodiments, the storage device of the virtual desktop server stores a hypervisor and a persistent copy of the VMs. In certain embodiments, the virtual desktop server is configured to: execute the hypervisor, copy the VMs from the persistent copy to the RAM disk, and execute the VMs at the RAM disk on the executed hypervisor. Each of the executed VMs is configured to provide one or more virtual desktops accessible for one or more thin clients.

In certain embodiments, the data write through operations further include: when the virtual desktop server is electrically powered by the UPS only and a power level of the UPS reaches a critical condition, efficiently copying the data in the RAM disk to the data store.

In certain embodiments, the efficiently copying the data in the RAM disk to the data store is performed by: comparing the data in the RAM disk to corresponding data stored in the data store at a block level, wherein a size of the block level is configurable; and if the data in the RAM disk does not match the corresponding data stored in the data store, copying the mismatched data in the RAM disk to the data store.

In certain embodiments, the computer executable code is further configured to send a warning message to each of the VMs to indicate an imminent shutdown of the virtual desktop server when the power level of the UPS reaches the critical condition.

In certain embodiments, the computer executable code is configured to send the warning message to each of the VMs based on a policy, and the policy includes: sending the warning message to the VMs unused or least recently used; and sending the warning message to the VMs in an order based on a predetermined VM priority for each of the VMs.

In certain embodiments, the power level of the UPS reaches the critical condition when a reserve power of the UPS is below a predetermined low level, or when a remaining time period that the UPS is capable of powering the virtual desktop server is below a predetermined threshold period. In certain embodiments, the predetermined low level is about 5%, and the predetermined threshold period is about 10 minutes. In certain embodiments, the predetermined threshold period may be updated by: obtaining an amount of data pending in the RAM disk; and dynamically calculating an updated value of the predetermined threshold period using the amount of data pending in the RAM disk and an input/output operations per second (IOPS) value of the data store as throughput.

In certain embodiments, the computer executable code is configured to detect the power status of the virtual desktop server using a power status monitor. In certain embodiments, the power status monitor is configured to: detect whether the virtual desktop server is electrically powered by the electric power supply and the UPS, or by the UPS only; and determine the power level of the UPS.

In certain embodiments, the computer executable code includes: a power management module configured to receive the detected power status of the virtual desktop server from the power status monitor; a receiving module configured to receive the data from the plurality of VMs; a write through module configured to perform the data write through operations; and a storage manager module configured to: create the data store, create the RAM disk, and control the write through module to enable or disable the data write through from the RAM disk to the data store based on the detected power status of the virtual desktop server received by the power management module.

In certain embodiments, the write through module is configured to perform the data write through operations by: storing the data received by the receiving module in the RAM disk when the data write through is disabled; and storing the data received by the receiving module in the RAM disk and in the data store when the data write through is enabled.

In another aspect, the present disclosure relates to a method of performing on-demand write through operations. In certain embodiments, the computer implemented method includes: allocating, at a virtual desktop server, a portion of a storage device of the virtual desktop server to create a data store for preserving data from a plurality of virtual machines (VMs), where the virtual desktop server is configured to be electrically powered by an electric power supply and an uninterruptable power supply (UPS); allocating, at the virtual desktop server, a portion of a memory of the virtual desktop server to create a random access memory (RAM) disk for hosting the plurality of VMs and writing through the data from the plurality of VMs to the data store; detecting a power status of the virtual desktop server; and performing a plurality of data write through operations based on the detected power status of the virtual desktop server. In certain embodiments, the data write through operations include: disabling data write through from the RAM disk to the data store, when the virtual desktop server is electrically powered by the electric power supply and the UPS; and enabling the data write through from the RAM disk to the data store, when the virtual desktop server is electrically powered by the UPS only.

In certain embodiments, the data write through operations further include: when the virtual desktop server is electrically powered by the UPS only and a power level of the UPS reaches a critical condition, efficiently copying the data in the RAM disk to the data store.

In certain embodiments, the efficiently copying the data in the RAM disk to the data store is performed by: comparing the data in the RAM disk to corresponding data stored in the data store at a block level, wherein a size of the block level is configurable; and if the data in the RAM disk does not match the corresponding data stored in the data store, copying the mismatched data in the RAM disk to the data store.

In certain embodiments, the method further includes: sending a warning message to each of the VMs based on a policy to indicate an imminent shutdown of the virtual desktop server when the power level of the UPS reaches the critical condition. In certain embodiments, the policy includes: sending the warning message to the VMs unused or least recently used; and sending the warning message to the VMs in an order based on a predetermined VM priority for each of the VMs.

In certain embodiments, the power level of the UPS reaches the critical condition when a reserve power of the UPS is below a predetermined low level, or when a remaining time period that the UPS is capable of powering the virtual desktop server is below a predetermined threshold period. In certain embodiments, the predetermined low level is about 5%, and the predetermined threshold period is about 10 minutes. In certain embodiments, the predetermined threshold period may be updated by: obtaining an amount of data pending in the RAM disk; and dynamically calculating an updated value of the predetermined threshold period using the amount of data pending in the RAM disk and an input/output operations per second (IOPS) value of the data store as throughput.

In certain embodiments, the power status of the virtual desktop server is detected by a power status monitor. In certain embodiments, the power status monitor is configured to: detect whether the virtual desktop server is electrically powered by the electric power supply and the UPS, or by the UPS only; and determine the power level of the UPS.

In certain embodiments, the data write through operations are performed by: storing the data received by the receiving module in the RAM disk when the data write through is disabled; and storing the data received by the receiving module in the RAM disk and in the data store when the data write through is enabled.

In yet another aspect, the present disclosure relates to a non-transitory computer readable medium storing computer executable code. In certain embodiments, when the computer executable code stored in the non-transitory computer readable medium is executed at a processor of a virtual desktop server, the computer executable code is configured to: allocate a portion of a storage device of the virtual desktop server to create a data store for preserving data from a plurality of virtual machines (VMs), where the virtual desktop server is configured to be electrically powered by an electric power supply and an uninterruptable power supply (UPS); allocate a portion of a memory of the virtual desktop server to create a random access memory (RAM) disk for hosting the plurality of VMs and writing through the data from the plurality of VMs to the data store; detect a power status of the virtual desktop server; and perform a plurality of data write through operations based on the detected power status of the virtual desktop server. In certain embodiments, the data write through operations include: disabling data write through from the RAM disk to the data store when the virtual desktop server is electrically powered by the electric power supply and the UPS; and enabling the data write through from the RAM disk to the data store when the virtual desktop server is electrically powered by the UPS only.

In certain embodiments, the data write through operations further include: when the virtual desktop server is electrically powered by the UPS only and a power level of the UPS reaches a critical condition, copying the data in the RAM disk to the data store.

In certain embodiments, the computer executable code is further configured to send a warning message to each of the VMs based on a policy to indicate an imminent shutdown of the virtual desktop server when the power level of the UPS reaches the critical condition. In certain embodiments, the policy includes: sending the warning message to the VMs unused or least recently used; and sending the warning message to the VMs in an order based on a predetermined VM priority for each of the VMs.

In certain embodiments, the power level of the UPS reaches the critical condition when a reserve power of the UPS is below a predetermined low level, or when a remaining time period that the UPS is capable of powering the virtual desktop server is below a predetermined threshold period. In certain embodiments, the predetermined low level is about 5%, and the predetermined threshold period is about 10 minutes. In certain embodiments, the predetermined threshold period may be updated by: obtaining an amount of data pending in the RAM disk; and dynamically calculating an updated value of the predetermined threshold period using the amount of data pending in the RAM disk and an input/output operations per second (IOPS) value of the data store as throughput.

In certain embodiments, the computer executable code is configured to detect the power status of the virtual desktop server using a power status monitor. In certain embodiments, the power status monitor is configured to: detect whether the virtual desktop server is electrically powered by the electric power supply and the UPS, or by the UPS only; and determine the power level of the UPS.

In certain embodiments, the computer executable code includes: a power management module configured to receive the detected power status of the virtual desktop server from the power status monitor; a receiving module configured to receive the data from the plurality of VMs; a write through module configured to perform the data write through operations; and a storage manager module configured to: create the data store, create the RAM disk, and control the write through module to enable or disable the data write through from the RAM disk to the data store based on the detected power status of the virtual desktop server received by the power management module.

In certain embodiments, the write through module is configured to perform the data write through operations by: storing the data received by the receiving module in the RAM disk when the data write through is disabled; and storing the data received by the receiving module in the RAM disk and in the data store when the data write through is enabled.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings FIGS. 1-4. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein.

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The term "launch a virtual machine", as used herein, generally refers to a process of instantiating or constructing a new virtual machine instance with a specific virtual machine ID on a hypervisor. Once the virtual machine is launched, the virtual machine in an "on" state. The term "shutting down a virtual machine", as used herein, generally refers to a process of deleting or destructing an existing virtual machine instance with a specific virtual machine ID on a hypervisor. Once the virtual machine is destructed, the virtual machine is in an "off" state.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, FIGS. 1-4, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

Figure 1:
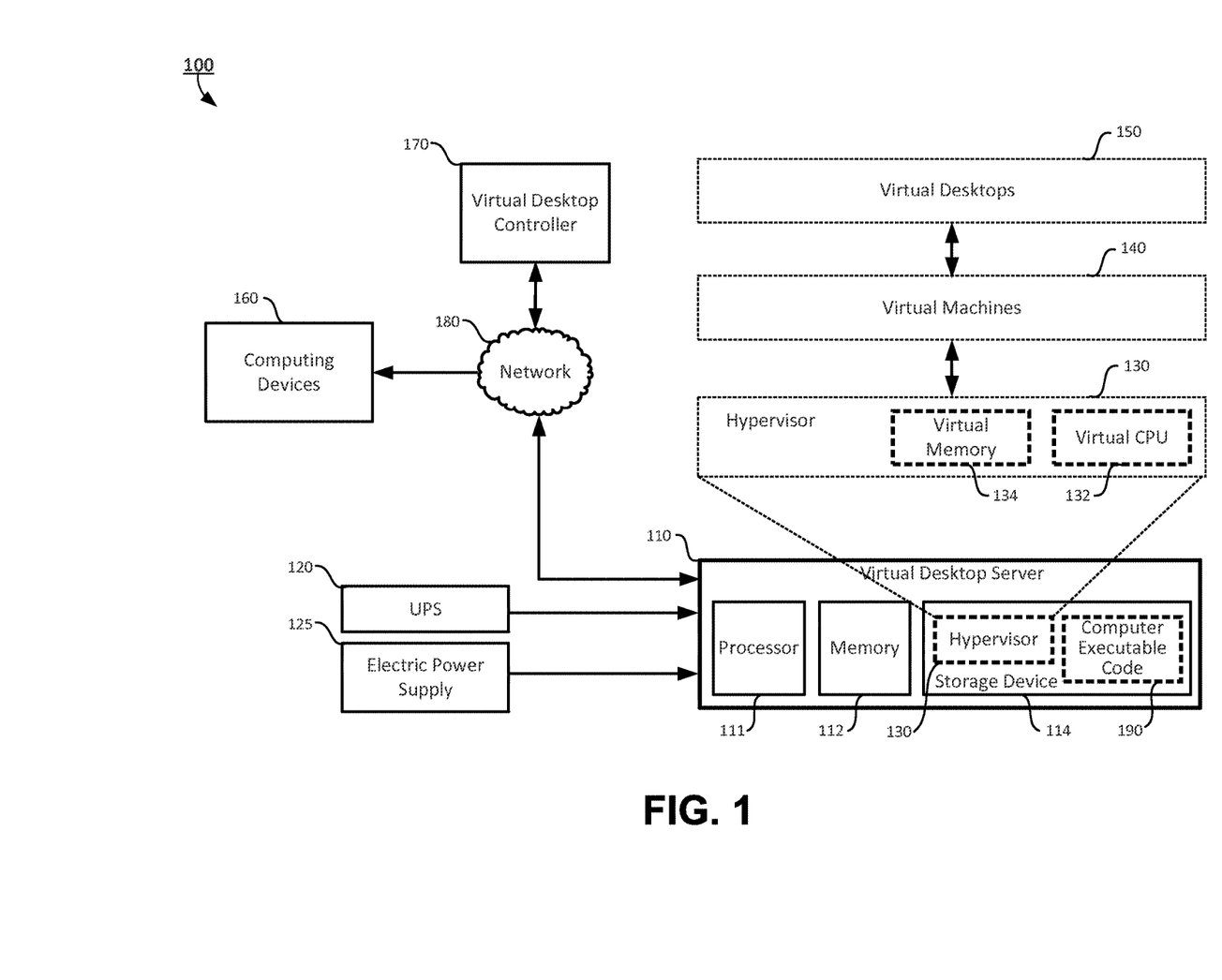
FIG. 1 schematically depicts an exemplary virtual desktop infrastructure (VDI) system according to certain embodiments of the present disclosure.

In accordance with the purposes of present disclosure, as embodied and broadly described herein, in certain aspects, the present disclosure relates to a virtual desktop infrastructure (VDI) system 100. FIG. 1 schematically depicts an exemplary VDI system according to certain embodiments of the present disclosure. As shown in FIG. 1, the system 100 includes: a virtual desktop server 110, an uninterruptible power supply (UPS) 120, one or more computing devices 160, a virtual desktop controller 170, and a network 180. The virtual desktop server 110 is connected to the UPS 120 and an electric power supply 125 such that the virtual desktop server 110 may be electrically powered by the electric power supply 125 and the UPS 120. The virtual desktop server 110, the computing devices 160, and the virtual desktop controller 170 are communicatively interconnected by the network 180. The network 180 may be a wired or wireless network, and may be of various forms, such as a public network and a private network. Examples of the network 180 may include, but not limited to, a local area network (LAN) or wide area network (WAN) including the Internet. In certain embodiments, two or more different networks 180 may be applied to connect the virtual desktop server 110, the UPS 120, the computing devices 160, and the virtual desktop controller 170.

The virtual desktop server 110 is a computing device which serves as a server for providing virtual machine services for the virtual desktop system 100. In certain embodiments, the virtual desktop server 110 may include necessary hardware and software components to perform certain predetermined tasks. For example, as shown in FIG. 1, the virtual desktop server 110 includes a processor 111, a memory 112, and a storage device 114. Further, the virtual desktop server 110 may include other hardware components and software components (not shown) to perform its corresponding tasks. Examples of these hardware and software components may include, but not limited to, other required memory, interfaces, buses, Input/Output (I/O) modules and peripheral devices.

The processor 111 is a host processor which is configured to control operation of the virtual desktop server 110. The processor 111 can execute the hypervisor 130 stored in the storage device 114, as well as other applications of the virtual desktop server 110. In certain embodiments, the virtual desktop server 110 may run on more than one central processing unit (CPU) as the host processor, such as two CPUs, four CPUs, eight CPUs, or any suitable number of CPUs.

The memory 112 can be a volatile memory, such as the random-access memory (RAM), for storing the data and information during the operation of the virtual desktop server 110.

The storage device 114 can be a non-volatile data storage media for storing a hypervisor 130 and other applications of the virtual desktop server 110. Examples of the storage device 114 may include flash memory, memory cards, USB drives, hard drives, floppy disks, optical drives, or any other types of suitable non-volatile data storage devices. The storage device access time varies widely among these storage devices listed here. For example, the flash memory, the memory cards, the USB drives are much faster than the hard drives, the floppy disks, and the optical drives, often in the ten, hundreds or thousands time. A typical hard drive is capable of up to 80-100 MB/s throughput when new. On the other hand, a one terabyte (TB) flash SSD using a PCI Express x8 interface, achieved a maximum write speed of 654 megabytes per second (MB/s) and maximum read speed of 712 MB/s.

The electric power supply 125 is an electrical apparatus that provides regular power to the virtual desktop server 110. In certain embodiments, the electric power supply 125 may be connected to a power source (not shown) such that the electric power supply 125 receives input power from the power source, and then provides the received power to the virtual desktop server 110. In certain embodiments, the power provided by the electric power supply 125 may be main alternating current (AC) power.

The UPS 120 is an electrical apparatus that provides emergency power to the virtual desktop server 110 when the electric power supply 125 fails. The UPS 120 will provide near-instantaneous protection from input power interruptions, by supplying energy stored in batteries or other energy storing devices. The UPS 120 is typically used to protect hardware such as computers, data centers, telecommunication equipment or other electrical equipment where an unexpected power disruption could cause injuries, fatalities, serious business disruption, serious equipment damages, or data loss. The on-battery runtime of the UPS 120 ranges from a few minutes to several hours. The UPS 120 with short on-battery runtime may be sufficient to start a standby power source or properly shut down the protected equipment. For large data centers, more powerful UPS 120 may be used for sustain longer runtime to avoid equipment damage or data loss.

Generally, when the electric power supply 125 is in operation, the virtual desktop server 110 is electrically powered by the electric power supply 125 and backed by the UPS 120. In this case, date stored in random access memory (RAM) may be considered persistent, and the electric power supply disruption will not cause any data loss because the virtual desktop server 110 does not loss electric power at least for the on-battery runtime of the UPS 120 for a period of time after the electric power supply 125 fails. Thus, the performance of the memory 112 of the virtual desktop server 110 may be considered non-volatile, and data write through operation is no longer required to preserve persistent data in the non-volatile storage devices such as the storage device 114. Therefore, the addition of the UPS 120 may greatly increase data storage and data cache throughput, thereby improving the efficiency of the virtual desktop server 110.

In certain embodiments, the UPS 120 may be a UPS at an entry level with 400-1000 VA, or a standard level with 1000-5000 VA depending on the power consumption of the virtual desktop server 110. In certain embodiments, the UPS 120 may have a UPS communication card (not shown) to provide statistics of the reserve power of the UPS 120 to the virtual desktop server 110. The UPS communication card may be configured to transmit all vital statistics of the UPS 120 to the virtual desktop server 110 through a wired communication channel or a wireless communication channel. In certain embodiments, the statistics of the reserve power of the UPS 120 may include one or both of a power level of the UPS 120, and a remaining time period that the UPS 120 is capable of providing power the virtual desktop server 110.

Figure 2:
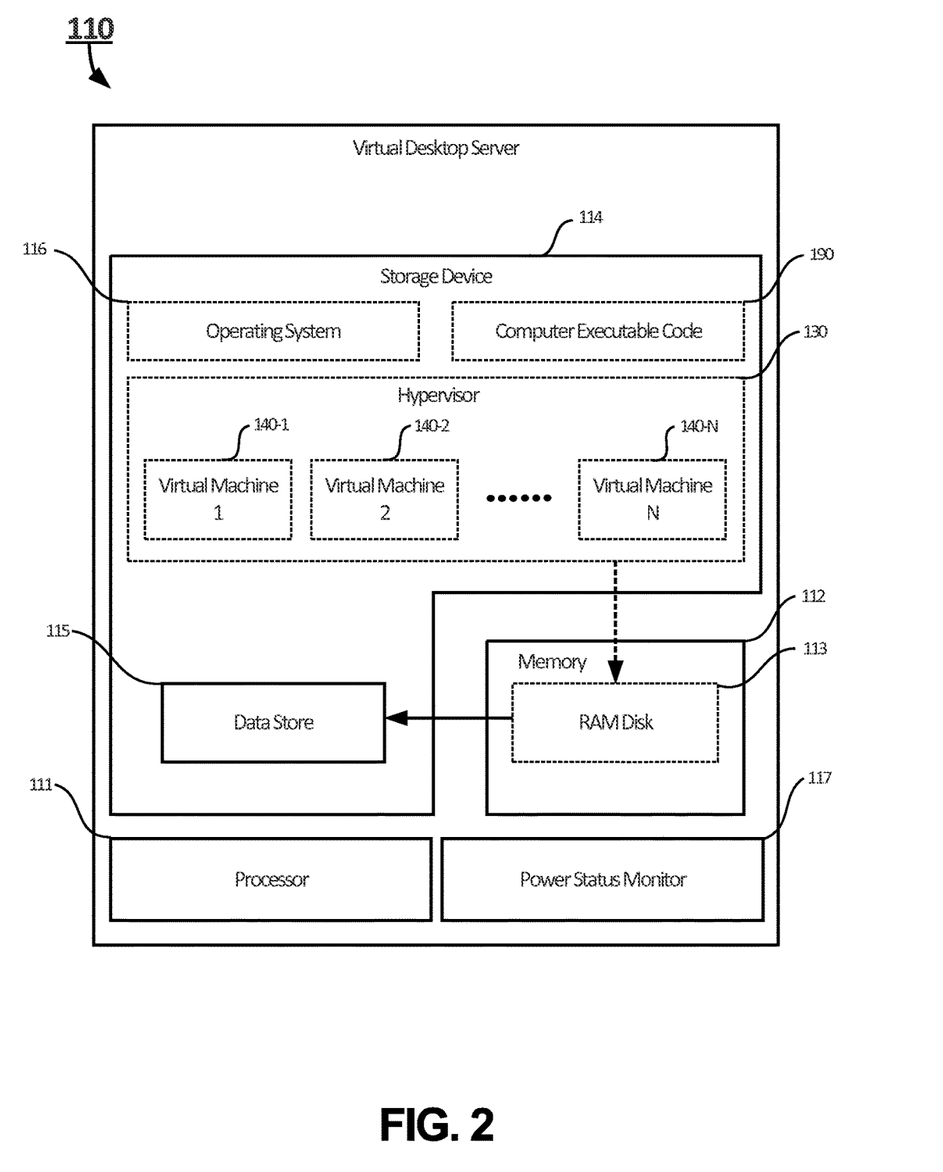
FIG. 2 schematically depicts the virtual desktop server according to certain embodiments of the present disclosure.

FIG. 2 schematically depicts the virtual desktop server 110 according to certain embodiments of the present disclosure. Specifically, as shown in FIG. 2, the virtual desktop server 110 includes the processor 111, the memory 112, the storage device 114, and a power status monitor 117. The storage device 114 stores an operating system (OS) 116, computer executable code 190, the hypervisor 130 and a plurality of VMs 140. Specifically, the storage device 114 stores a persistent copy of each of the VMs 140.

The power status monitor 117 is a device for detecting the power status of the virtual desktop server 110. In certain embodiments, the power status monitor 117 may be implemented by a physical device. Alternatively, in certain embodiments, the power status monitor 117 may be implemented by software programs. In certain embodiments, the power status monitor 117 may be configured to detect whether the virtual desktop server 110 is electrically powered by the electric power supply 125 and the UPS 120, or by the UPS 120 only. Further, in certain embodiments, the power status monitor 117 may be configured to determine the power level of the UPS 120.

The hypervisor 130 is a program that allows multiple virtual machine (VM) instances 140 to run simultaneously and share a single hardware host, such as the virtual desktop server 110. The hypervisor 130, when executed at the processor 111 or any other processor, implements hardware virtualization techniques and allows one or more operating systems or other applications to run concurrently as guests of one or more virtual machines 140 on the virtual desktop server 110. The hypervisor 130 allows each user to run an operating system instance as a virtual machine. In certain embodiments, the hypervisor 130 can be of various types and designs, such as MICROSOFT HYPER-V, XEN, VMWARE ESX, or other types of hypervisors.

Referring back to FIG. 1, in certain embodiments, the virtual desktop server 110 is configured to execute the hypervisor 130, copy each of the VMs 140 from the corresponding persistent copy to a RAM disk, and execute the VMs 140 at the RAM disk on the executed hypervisor 130. Details of the RAM disk will be described later. When the hypervisor instance 130 runs on the virtual desktop server 110, the hypervisor 130 emulates a virtual computer machine, including a virtual CPU 132 and a virtual memory 134 as shown in FIG. 1. A plurality of VMs 140 can operate in the hypervisor 130. Each VM 140 can run a virtual machine operation system (VMOS), such as WINDOWS or LINUX. For brevity, unless otherwise noted, the VM and the VMOS run in that VM are collectively referred to as a VM.

In certain embodiments, the VMs 140 include N virtual machines 140, which include a first virtual machine 140-1, a second virtual machine 140-2, . . . , and a N-th virtual machine 140-N, where N is a positive integer. In certain embodiments, one or more virtual desktops 150 (collectively shown in FIG. 1) may be operating on each of the virtual machines 140. In one embodiment, the virtual desktops 150 include M virtual desktops 150, which include a first virtual desktop 150-1, a second virtual desktop 150-2, . . . , and a M-th virtual desktop 150-M, where M is a positive integer. In one embodiment, each of the virtual desktops 150 is running on a corresponding virtual machine 140. In this case, the number M of the virtual desktops 150 is equal to the number N of the virtual machines 140. In another embodiment, each of the virtual desktops 150 runs on one or more virtual machines 140. In this case, the number M of the virtual desktops 150 is different from the number N of the virtual machines 140.

Each of the computing devices 160 functions as a thin client, which is operated by various users to access one of the virtual desktops 150. In certain embodiments, each of the computing devices 160 is in communication with the virtual desktop controller 170 through the network 180. The computing devices 160 (not individually shown in FIG. 2) includes a first computing device 160-1, a second computing device 160-2, . . . , and a k-th computing device 160-K, where K is a positive integer. In other words, the number of the computing devices 160 is K. In certain embodiments, the number K of the computing devices 160 may be equal to the number M of the virtual desktops 150 and/or the number N of the virtual machines 140, or may be different from the number M of the virtual desktops 150 and/or the number N of the virtual machines 140.

In certain embodiments, the computing devices 160 function as thin clients. Each of the computing devices 160 can be: a desktop computer, a laptop computer, a netbook computer, a notebook computer, a tablet computer, a smart mobile phone and/or other network connected terminal devices.

The virtual desktop controller 170 is a controller to control and manage the operation of the virtual desktops 150 and the virtual machines 140 of the virtual desktop system 100. As described above, the virtual machines 140 provides the virtual desktops 150 to various user devices operated by various users. The virtual desktop controller 170 allows an administrator of the virtual desktop system 100 to set up, administer, and manage the virtual desktops 150 and the virtual machines 150 of the virtual desktop system 100.

In certain embodiments, when the virtual machines (VMs) 140 are operating on the hypervisor 130, the virtual machines 140 constantly exchange data with the processor 111 in the memory 112. The data exchanged can be divided into two types: a temporary type, and a persistent type. The temporary data need only to be stored in the memory 112, and the persistent data need to be stored in the non-volatile storage device 114. In certain embodiments, write through cache is used to speed up the data access/exchange. Write through is a storage method in which persistent data is written into a cache in the memory 112, and the corresponding non-volatile storage device 114 at the same time. The cached data allows for fast retrieval on demand, while the same data in the non-volatile storage device 114 ensures that nothing will get lost if a power failure occurs.

In order to improve the throughput of data input and output, a cache such as a RAM disk is used to decrease the memory access time. When certain data needs to be stored in the non-volatile storage, the data is first stored in the RAM disk, and then an identical copy of the data cached in the RAM disk is stored in the non-volatile storage device. The processor 111 accesses only the data in the RAM disk, instead of accessing the non-volatile storage device 114 such as a hard drive, a solid state drive, or other non-volatile storage devices. The access to the non-volatile storage device 114 takes significantly longer time. Therefore, using the RAM disk saves time, and precious resources of the virtual desktop server 110.

Referring to FIG. 2, in certain embodiments, a portion of the memory 112 is allocated to form a RAM disk 113, and a portion of the non-volatile storage device 114 is allocated to form a data store 115. The RAM disk 113 is used for hosting the VMs 140 and writing through the data from the VMs 140 to the data store 115. At certain time, the data in the RAM disk 113 is written to the data store of the non-volatile storage device 114 as permanent records. On the other hand, the memory 112, which is volatile, requires power to maintain information stored in the memory 112. It retains its contents while powered, and if the electric power supply 125 to the virtual desktop server 110 is interrupted with the UPS 120 being available, the information stored is immediately lost. In order to make RAM disk 113 a non-volatile storage device, certain measures must be taken to ensure the memory 112 is constantly powered. For example, the virtual desktop server 110 may be powered by the UPS 120.

When the virtual desktop server 110 is powered by the UPS 120 in addition to the electric power supply 125, an interruption due to power failure will not cause the virtual desktop server 110 to loss any data because the virtual desktop server 110 will be powered for a certain period of time (the on-battery runtime of the battery inside the UPS 120) before the battery in the UPS 120 is exhausted. Therefore, the use of the UPS 120 renders the data write through operation unnecessary.

Based on the above structure of the virtual desktop server 110, an on-demand data write through operation may be provided as follows. When the virtual desktop server 110 is under normal operation, the virtual desktop server 110 is powered by the electric power supply 125 and the UPS 120, and the persistent data only need to be stored in the RAM disk 113. In this case, data write through may be disabled. On the other hand, when the virtual desktop server 110 losses the electric power supply and is powered only by the UPS 120, then data write through should be enabled, and the persistent data is stored in the RAM disk 113 for fast access, and an identical copy of the persistent data is also written through to the data store 115 of the storage device 114. In certain embodiments, when the virtual desktop server 110 is electrically powered by the UPS 120 only, and the power level of the UPS 120 reaches a critical condition, then the data stored in the RAM disk 113 that was not stored in the non-volatile storage device 114 must be copied from the RAM disk 113 to the non-volatile storage device 114 for persistency.

The computer executable code 190 is the software code which, when executed at the processor 111, is configured to perform the on-demand data write through operations for the virtual desktop server 110. In certain embodiments, the computer executable code 190, when executed at the processor 111, may be configured to: allocate a portion of the storage device 114 to create a data store 115 for preserving data from a plurality of VMs 140; allocate a portion of the memory 112 to create a RAM disk 113 for writing through the data from the plurality of VMs 140 to the data store 115; detect a power status of the virtual desktop server 110; and perform a plurality of data write through operations based on the detected power status of the virtual desktop server 110. In certain embodiments, the data write through operations may include: disabling data write through from the RAM disk 113 to the data store 115 when the virtual desktop server 110 is electrically powered by the electric power supply 125 and the UPS 120; and enabling the data write through from the RAM disk 113 to the data store 115 when the virtual desktop server 110 is electrically powered by the UPS 120 only. In certain embodiments, the data write through operation may further include: when the virtual desktop server 110 is electrically powered by the UPS 120 only and a power level of the UPS 120 reaches a critical condition, efficiently copying the data in the RAM disk 113 to the data store 115.

The term "efficiently" in the process of efficiently copying the data in the RAM disk 113 to the data store 115 refers to a process to copy only necessary data from the RAM disk 113 to the data store 115. In certain embodiments, the necessary data may refer to the mismatched data. In other words, the copying operation will only occur when there is a data mismatch between the RAM disk 113 and the data store 115. In certain embodiments, the process of efficiently copying the data in the RAM disk 113 to the data store 115 is performed by comparing the data in the RAM disk 113 to corresponding data stored in the data store 115. If the data in the RAM disk 113 does not match the corresponding data stored in the data store 115, the mismatched data in the RAM disk 113 is copied to the data store 115. If the data in the RAM disk 113 matches the corresponding data stored in the data store 115, there is no need to copy the matched data.

Thus, the copying process may be efficient. In certain embodiments, the comparison of the data in the RAM disk 113 to corresponding data stored in the data store 115 may happen at a block level. In other words, a block-to-block comparison is performed between the data in the RAM disk 113 to corresponding data stored in the data store 115. In certain embodiments, a size of the block level is configurable.

Figure 3:
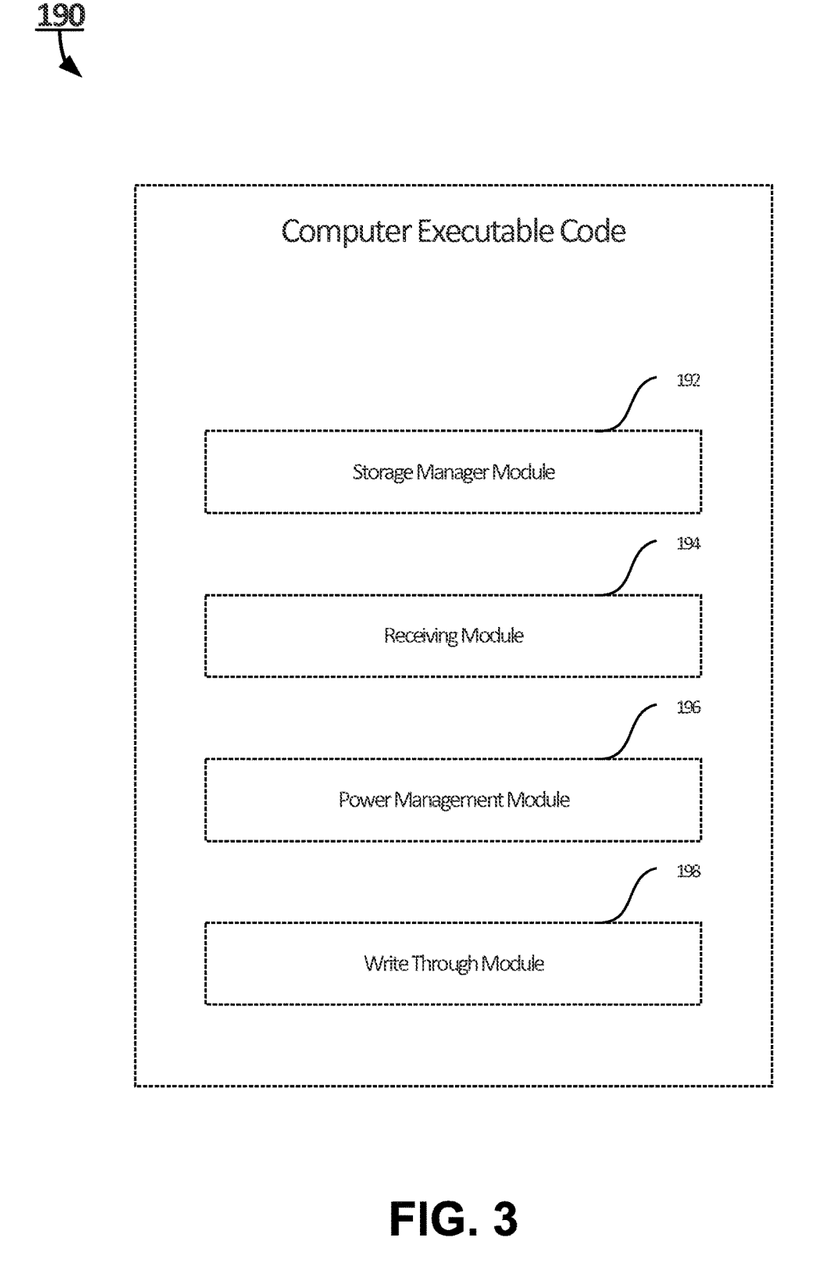
FIG. 3 shows a block diagram of computer executable code for performing on-demand data write through according to certain embodiments of the present disclosure.

FIG. 3 shows a block diagram of computer executable code for performing on-demand data write through according to certain embodiments of the present disclosure. As shown in FIG. 3, the computer executable code 190 includes a storage manager module 192, a receiving module 194, a power management module 196, and a write through module 198. In certain embodiments, the computer executable code 190 may include other modules to perform other functions.

The storage manager module 192 is a software module configured to create the data store 115 in the storage device 114, to create the RAM disk 113 in the memory 112, and to control the write through module 198 to enable or disable the data write through from the RAM disk 113 to the data store 115 based on the detected power status of the virtual desktop server 110 received by the power management module 196.

The receiving module 194 is configured to receive the data to be preserved from the VMs 140, where the data may be processed by the write through module 198.

The power management module 196 is configured to receive the detected power status of the virtual desktop server 110 from the power status monitor 117, and provide the power status to the storage manager module 192, such that the storage manager module 192 may control the write through module 198 to enable or disable the data write through from the RAM disk 113 to the data store 115 based on the detected power status.

The write through module 198 is configured to perform the data write through operations. In certain embodiments, the write through module 198 is configured to perform the data write through operations by: storing the data received from the receiving module 194 in the RAM disk 113 when the data write through is disabled; and storing the data received by the receiving module 194 in the RAM disk 113 and in the data store 115 when the data write through is enabled.

In certain embodiments, the power level of the UPS 120 is determined to reach the critical condition when a reserve power of the UPS 120 is below a predetermined low level, for example, about 5%. Alternatively, in certain embodiments, the power level of the UPS 120 is determined to reach the critical condition when a remaining time period that the UPS 120 is capable of powering the virtual desktop server 110 is below a predetermined threshold period, for example, about 10 minutes.

In certain embodiments, the critical condition may also be kinetic by taking into consideration the current operation of the virtual desktop server 110. For example, when the virtual desktop server 110 is running one or more data processing/data mining programs/applications by one or more virtual machines 140, it may take a long time (i.e. 30 minutes) to complete these programs/applications. In this case, the critical condition may be determined by the virtual desktop server 110 to be a longer remaining time period that the UPS 120 is capable of powering the virtual desktop server 110, such as about 35 minutes, instead of 10 minutes to ensure all data in the RAM disk 113 are written to the non-volatile storage device 114 to avoid any potential data loss. In response to the kinetic critical condition, the values of the predetermined low level and the predetermined threshold period may be configurable, or may be dynamically updated based on the operation of the system 100. In certain embodiments, for example, the predetermined threshold period may be updated by obtaining an amount of data pending in the RAM disk 113, and dynamically calculating an updated value of the predetermined threshold period using the amount of data pending in the RAM disk 113 and an input/output operations per second (IOPS) value of the data store 115 as throughput. In this case, the value of the predetermined threshold period may be dynamically updated.

In certain embodiments, the computer executable code 190 is further configured to send a warning message to each of the VMs 140 to indicate an imminent shutdown of the virtual desktop server 110 when the power level of the UPS 120 reaches the critical condition. When a user operating one of the VMs 140 receives the warning message, the user may prepare for shutting down the virtual desktop server 110 and gracefully exit certain programs and applications so that no data loss occurs when the battery of the UPS 120 runs out. This preparation includes saving certain data or files, saving the virtual machine configuration data, and closing out certain tasks currently running until all the tasks are shut down. Once all tasks are shut down, the virtual desktop server 110 may be powered off before the remaining power in the UPS 120 is completely used.

In certain embodiments, the computer executable code 190 may be configured to send the warning message to each of the VMs 140 based on a policy. For example, the policy may indicate that it is necessary for the computer executable code 190 to send the warning message to the VMs 140 unused or least recently used, as it is more likely for the users of the recently used VMs 140 to notice that the power level of the UPS 120 has reaches the critical condition. In certain embodiments, the policy may involve assigning a predetermined VM priority for each of the VMs 140, such that the computer executable code 190 may send the warning message to the VMs 140 in an order based on the predetermined VM priority for each of the VMs 140.

Another aspect of the present disclosure relates to a computer implemented method of performing on-demand write through operations. In certain embodiments, the method may be implemented by the execution of computer executable code 190 at the processor 111 of the virtual desktop server 110 of the system 100, as shown in FIGS. 1-3.

Figure 4:
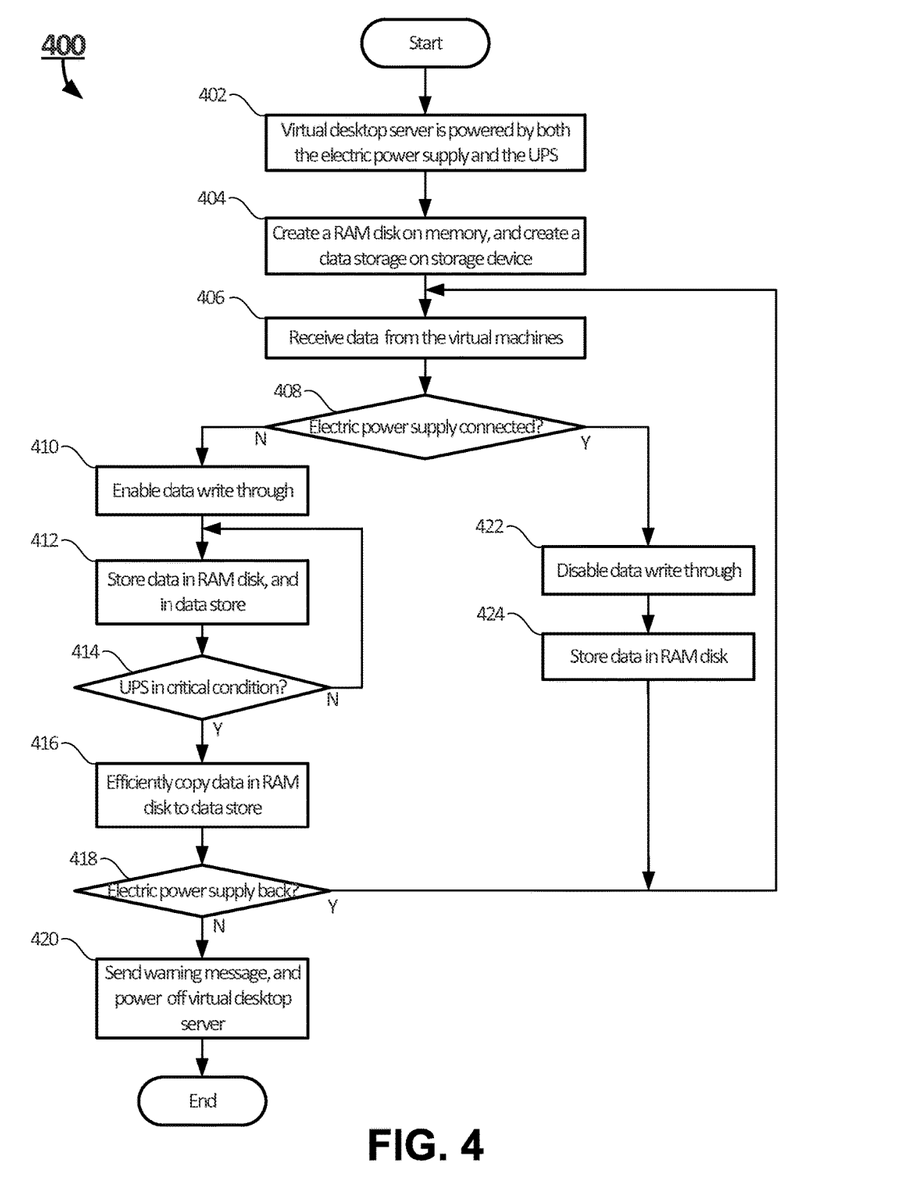
FIG. 4 shows a flowchart of a method for performing on-demand data write through according to certain embodiments of the present disclosure.

FIG. 4 shows a flowchart of a method for performing on-demand data write through according to certain embodiments of the present disclosure. As described above, the method may be implemented by the execution of the computer executable code 190 at the virtual desktop server 110.

At procedure 402, when the virtual desktop server 110 starts, the virtual desktop server 110 is generally powered by both the electric power supply 125 and the UPS 120. In this case, the virtual desktop 110 is being started under normal operation.

At procedure 404, during the starting process of the virtual desktop server 110, the storage manager module 192 of the computer executable code 190 allocates a portion of the storage device 114 to create the data store 115, and allocates a portion of the memory 112 to create the RAM disk 113.

Once the data store 115 and the RAM disk 113 are available, at procedure 406, the virtual desktop server 110 is ready to perform on-demand write through operations. The receiving module 194 of the computer executable code 190 may then receive data from the virtual machines 140.

At procedure 408, the power management module 196 controls the power status monitor 117 to monitor the power status of the virtual desktop server 110. Based on the detected power status by the power status monitor 117, the power management module 196 may determine whether the electric power supply 125 is powering the virtual desktop server 110. When the virtual desktop server 110 is powered by the electric power supply 125 and the UPS 120, the executed computer executable code 190 proceeds to procedure 422 to disable or skip data write through, and store any received data in the RAM disk 113 only. When the virtual desktop server 110 is only powered by the UPS 120, i.e., the electric power supply is interrupted or lost, the executed computer executable code 190 proceeds to procedure 410 to enable data write through.

At procedure 410, based on the detected power status of the virtual desktop server 110 received by the power management module 196, the storage manager module 192 enables data write through to ensure the data stored in the RAM disk 113 is also stored into the data store 115 to prevent data loss.

At procedure 412, the write through module 198 stores received data in the RAM disk 113, and in the data store 115 of the storage device 114. This operation continues until the UPS 120 reaches a critical condition.

At procedure 414, the power management module 196 continues monitoring the power level of the UPS 120. When the UPS 120 has not reached the critical condition, the executed computer executable code 190 proceeds to procedure 412 to continue performing the data write through operation. When the UPS 120 has reached the critical condition, the executed computer executable code 190 proceeds to procedure 416 to efficiently copy the data in the RAM disk 113 to the data store 115.

At procedure 416, the write through module 198 efficiently copy all data in the RAM disk 113 to the data store 115 of the storage device 114 to ensure no data loss before the virtual desktop server 110 is forced to be shut down. As described above, in certain embodiments, the process of efficiently copying the data in the RAM disk 113 to the data store 115 is performed by comparing the data in the RAM disk 113 to corresponding data stored in the data store 115. If the data in the RAM disk 113 does not match the corresponding data stored in the data store 115, the mismatched data in the RAM disk 113 is copied to the data store 115. If the data in the RAM disk 113 matches the corresponding data stored in the data store 115, there is no need to copy the matched data. Thus, the copying process may be efficient. In certain embodiments, the comparison of the data in the RAM disk 113 to corresponding data stored in the data store 115 may happen at a block level. In other words, a block-to-block comparison is performed between the data in the RAM disk 113 to corresponding data stored in the data store 115. In certain embodiments, a size of the block level is configurable.

At procedure 418, the power management module 196 continues monitoring the power status of the virtual desktop server 110. If the electric power supply 125 comes back to be available for powering the virtual desktop server 110, the executed computer executable code 190 proceeds to procedure 406. Otherwise, if the electric power supply 125 does not come back until the reserve power of the UPS 120 is low, the executed computer executable code 190 proceeds to procedure 420.

At procedure 420, the power management module 196 sends out warning messages to all virtual machines 140 to alert the users of the virtual machines 140 that the virtual desktop server 110 is about to be shut down due to electric power supply interruption, and possibly give an estimate of time when the virtual desktop server 110 will be shut down. On the other hand, the virtual desktop server 110 will also prepare the virtual machines 140 to gracefully shut down as well. This preparation includes saving certain data or files, saving the virtual machine configuration data, and closing out certain tasks currently running until all the tasks are shut down. Once all tasks are shut down, the virtual desktop server 110 may be powered off before the remaining power in the UPS 120 is completely used.

On the other hand, at procedure 422 when the virtual desktop server 110 is powered by both the electric power supply 125 and the UPS 120, then all data write through may be disabled or suspended because the RAM disk 113 may be treated as persistent data storage due to the utilization of the UPS 120 to prevent data loss in an event of electric power supply failure. Therefore, the storage manager module 192 disables data write through.

At procedure 424, the write through module 198 stores the received data in the RAM disk 113 without copying the data to the data store 115. After this operation, the loop of procedures 406, 408, 422, and 424 is repeated until the electric power supply is interrupted or lost.

In yet another aspect, the present disclosure relates to a non-transitory computer readable medium storing computer executable code. In certain embodiments, the computer executable code may be the computer executable code 190 as described above for performing on-demand write through operations. In certain embodiments, the non-transitory computer readable medium may include, but not limited to, the storage device 114 as described above, or any other storage media of the virtual desktop server 110.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:
1. A system, comprising:
a virtual desktop server configured to be electrically powered by an electric power supply and an uninterruptible power supply (UPS), the virtual desktop server comprising:
a processor;
a memory; and
a storage device storing computer executable code,
wherein the computer executable code, when executed at the processor, is configured to:
allocate a portion of the storage device to create a data store for preserving data from a plurality of virtual machines (VMs);
allocate a portion of the memory to create a random access memory (RAM) disk for hosting the plurality of VMs and writing through the data from the plurality of VMs to the data store;

detect a power status of the virtual desktop server; and perform a plurality of data write through operations based on the detected power status of the virtual desktop server, the data write through operations comprising:

disabling data write through from the RAM disk to the data store when the virtual desktop server is electrically powered by the electric power supply and the UPS;

enabling the data write through from the RAM disk to the data store when the virtual desktop server is electrically powered by the UPS only; and when the virtual desktop server is electrically powered by the UPS only and a power level of the UPS reaches a critical condition defined as a remaining time period that the UPS is capable of powering the virtual desktop server being below a threshold period dynamically updated and determined by an amount of data pending in the RAM disk and an input/output operations per second (IOPS) value of the data store as throughput, efficiently copying the data in the RAM disk to the data store.

2. The system of claim 1, wherein the storage device of the virtual desktop server further stores a hypervisor and a persistent copy of the plurality of VMs, wherein the virtual desktop server is configured to:

execute the hypervisor;

copy the VMs from the persistent copy to the RAM disk; and execute the VMs at the RAM disk on the executed hypervisor, wherein each of the executed VMs is configured to provide one or more virtual desktops accessible for a plurality of computing devices functioning as a plurality of thin clients.

3. The system of claim 1, wherein the efficiently copying the data in the RAM disk to the data store is performed by:

comparing the data in the RAM disk to corresponding data stored in the data store at a block level, wherein a size of the block level is configurable; and if the data in the RAM disk does not match the corresponding data stored in the data store, copying the mismatched data in the RAM disk to the data store.

4. The system of claim 1, wherein the computer executable code is further configured to send a warning message to each of the VMs to indicate an imminent shutdown of the virtual desktop server when the power level of the UPS reaches the critical condition.

5. The system of claim 4, wherein the computer executable code is configured to send the warning message to each of the VMs based on a policy, wherein the policy comprises:

sending the warning message to the VMs unused or least recently used; and sending the warning message to the VMs in an order based on a predetermined VM priority for each of the VMs.

6. The system of claim 1, wherein the computer executable code is configured to detect the power status of the virtual desktop server using a power status monitor, wherein the power status monitor is configured to:

detect whether the virtual desktop server is electrically powered by the electric power supply and the UPS, or by the UPS only; and determine the power level of the UPS.

7. The system of claim 6, wherein the computer executable code comprises:

a power management module configured to receive the detected power status of the virtual desktop server from the power status monitor;

a receiving module configured to receive the data from the plurality of VMs;

a write through module configured to perform the data write through operations; and a storage manager module configured to:

create the data store, create the RAM disk, and control the write through module to enable or disable the data write through from the RAM disk to the data store based on the detected power status of the virtual desktop server received by the power management module.

8. The system of claim 7, wherein the write through module is configured to perform the data write through operations by:

storing the data received by the receiving module in the RAM disk when the data write through is disabled; and storing the data received by the receiving module in the RAM disk and in the data store when the data write through is enabled.

9. A method of performing on-demand write through operations, comprising:

allocating, at a virtual desktop server, a portion of a storage device of the virtual desktop server to create a data store for preserving data from a plurality of virtual machines (VMs), wherein the virtual desktop server is configured to be electrically powered by an electric power supply and an uninterruptible power supply (UPS);

allocating, at the virtual desktop server, a portion of a memory of the virtual desktop server to create a random access memory (RAM) disk for hosting the plurality of VMs and writing through the data from the plurality of VMs to the data store;

detecting a power status of the virtual desktop server;

performing a plurality of data write through operations based on the detected power status of the virtual desktop server, the data write through operations comprising:

disabling data write through from the RAM disk to the data store, when the virtual desktop server is electrically powered by the electric power supply and the UPS;

enabling the data write through from the RAM disk to the data store, when the virtual desktop server is electrically powered by the UPS only; and when the virtual desktop server is electrically powered by the UPS only and a power level of the UPS reaches a critical condition defined as a remaining time period that the UPS is capable of powering the virtual desktop server being below a threshold period dynamically updated and determined by an amount of data pending in the RAM disk and an input/output operations per second (IOPS) value of the data store as throughput, efficiently copying the data in the RAM disk to the data store.

10. The method of claim 9, wherein the efficiently copying the data in the RAM disk to the data store is performed by:

comparing the data in the RAM disk to corresponding data stored in the data store at a block level, wherein a size of the block level is configurable; and if the data in the RAM disk does not match the corresponding data stored in the data store, copying the mismatched data in the RAM disk to the data store.

11. The method of claim 9, further comprising:
sending a warning message to each of the VMs based on a policy to indicate an imminent shutdown of the virtual desktop server when the power level of the UPS reaches the critical condition, wherein the policy comprises:
   sending the warning message to the VMs unused or least recently used; and
   sending the warning message to the VMs in an order based on a predetermined VM priority for each of the VMs.

12. The method of claim 9, wherein the power status of the virtual desktop server is detected by a power status monitor, wherein the power status monitor is configured to:
detecting, by a power status monitor of the virtual desktop server, whether the virtual desktop server is electrically powered by the electric power supply and the UPS, or by the UPS only; and
determining, by the power status monitor, the power level of the UPS.

13. The method of claim 12, wherein the data write through operations are performed by:
storing the data received from the plurality of VMs in the RAM disk when the data write through is disabled; and
storing the data received from the plurality of VMs in the RAM disk and in the data store when the data write through is enabled.

14. A non-transitory computer readable medium storing computer executable code, wherein the computer executable code, when executed at a processor of a virtual desktop server, is configured to:
allocate a portion of a storage device of the virtual desktop server to create a data store for preserving data from a plurality of virtual machines (VMs), wherein the virtual desktop server is configured to be electrically powered by an electric power supply and an uninterruptible power supply (UPS);
allocate a portion of a memory of the virtual desktop server to create a random access memory (RAM) disk for hosting the plurality of VMs and writing through the data from the plurality of VMs to the data store;
detect a power status of the virtual desktop server; and
perform a plurality of data write through operations based on the detected power status of the virtual desktop server, the data write through operations comprising:
disabling data write through from the RAM disk to the data store when the virtual desktop server is electrically powered by the electric power supply and the UPS;
enabling the data write through from the RAM disk to the data store when the virtual desktop server is electrically powered by the UPS only; and
when the virtual desktop server is electrically powered by the UPS only and a power level of the UPS reaches a critical condition defined as a remaining time period that the UPS is capable of powering the virtual desktop server being below a threshold period dynamically updated and determined by an amount of data pending in the RAM disk and an input/output operations per second (IOPS) value of the data store as throughput, efficiently copying the data in the RAM disk to the data store.

15. The non-transitory computer readable medium of claim 14, wherein the efficiently copying the data in the RAM disk to the data store is performed by:
comparing the data in the RAM disk to corresponding data stored in the data store at a block level, wherein a size of the block level is configurable; and
if the data in the RAM disk does not match the corresponding data stored in the data store, copying the mismatched data in the RAM disk to the data store.

16. The non-transitory computer readable medium of claim 14, wherein the computer executable code is further configured to send a warning message to each of the VMs based on a policy to indicate an imminent shutdown of the virtual desktop server when the power level of the UPS reaches the critical condition, wherein the policy comprises:
sending the warning message to the VMs unused or least recently used; and
sending the warning message to the VMs in an order based on a predetermined VM priority for each of the VMs.

17. The non-transitory computer readable medium of claim 16, wherein the computer executable code is configured to detect the power status of the virtual desktop server using a power status monitor, wherein the power status monitor is configured to:
detect whether the virtual desktop server is electrically powered by the electric power supply and the UPS, or by the UPS only; and
determine the power level of the UPS.

18. The non-transitory computer readable medium of claim 17, wherein the computer executable code comprises:
a power management module configured to receive the detected power status of the virtual desktop server from the power status monitor;
a receiving module configured to receive the data from the plurality of VMs;
a write through module configured to perform the data write through operations; and
a storage manager module configured to:
  create the data store,
  create the RAM disk, and
  control the write through module to enable or disable the data write through from the RAM disk to the data store based on the detected power status of the virtual desktop server received by the power management module.

19. The non-transitory computer readable medium of claim 18, wherein the write through module is configured to perform the data write through operations by:
storing the data received by the receiving module in the RAM disk when the data write through is disabled; and
storing the data received by the receiving module in the RAM disk and in the data store when the data write through is enabled.

* * * * *